March 17, 1953   P. J. HAYNES ET AL   2,631,853
RACING GAME APPARATUS
Filed June 9, 1950   3 Sheets-Sheet 2
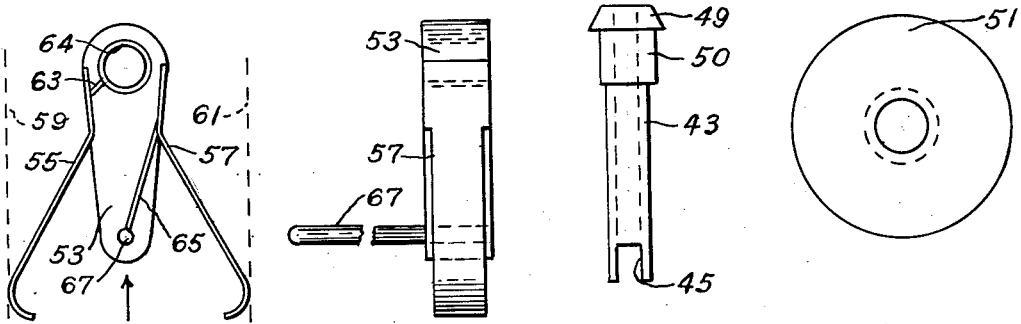
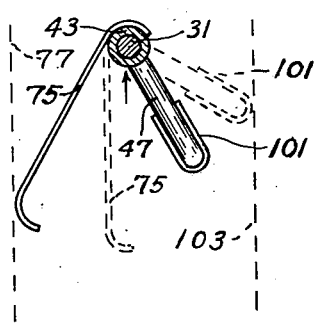
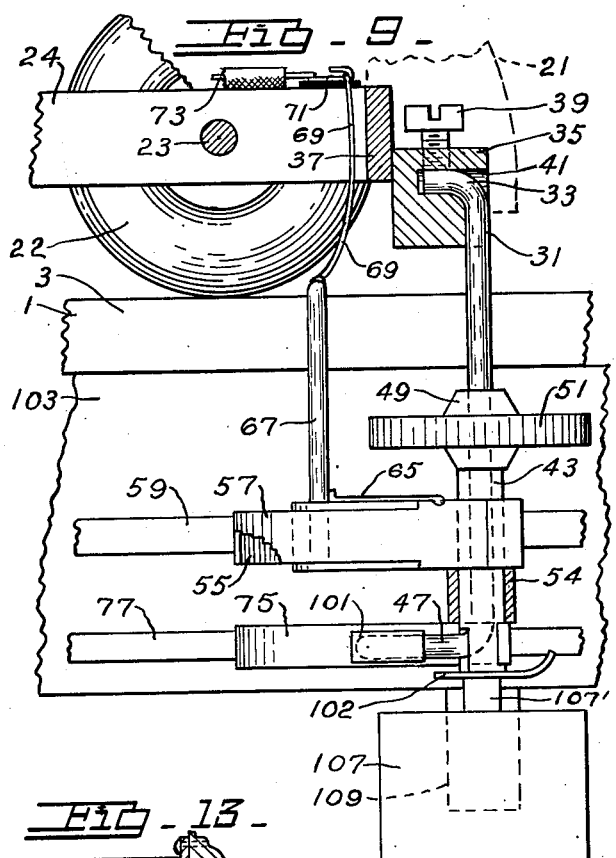
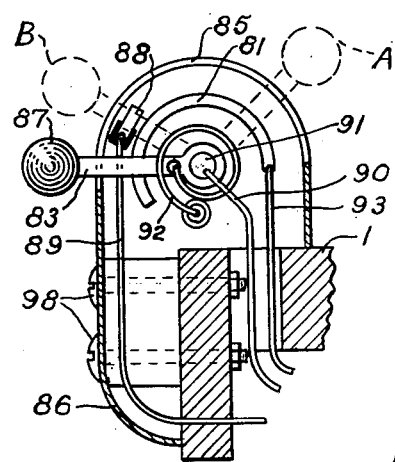
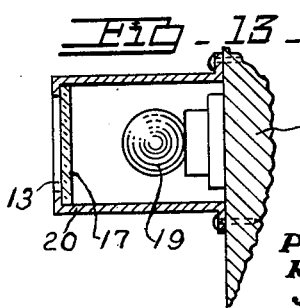
INVENTORS.
PHILLIP J. HAYNES
RAY HAYNES
JOHN HAYNES
BY F. J. Hicks
THEIR ATTORNEY March 17, 1953 P. J. HAYNES ET AL 2,631,853
RACING GAME APPARATUS
Filed June 9, 1950 3 Sheets-Sheet 3
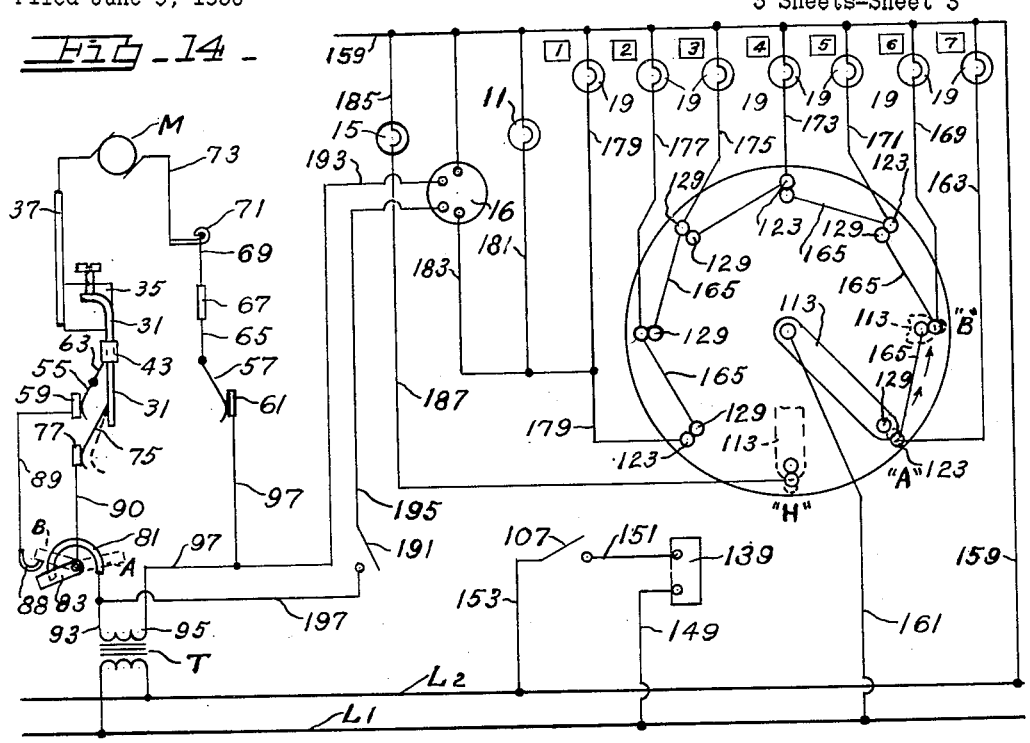
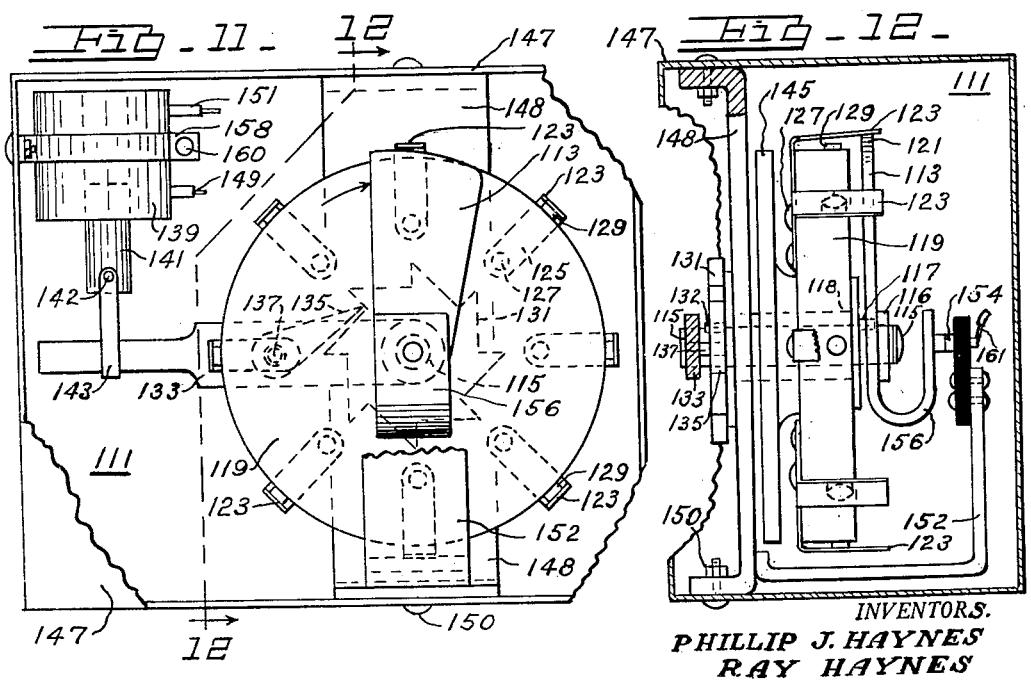
INVENTORS.
PHILLIP J. HAYNES
RAY HAYNES
JOHN HAYNES
BY F. D. Ficks
THEIR ATTORNEY Patented Mar. 17, 1953

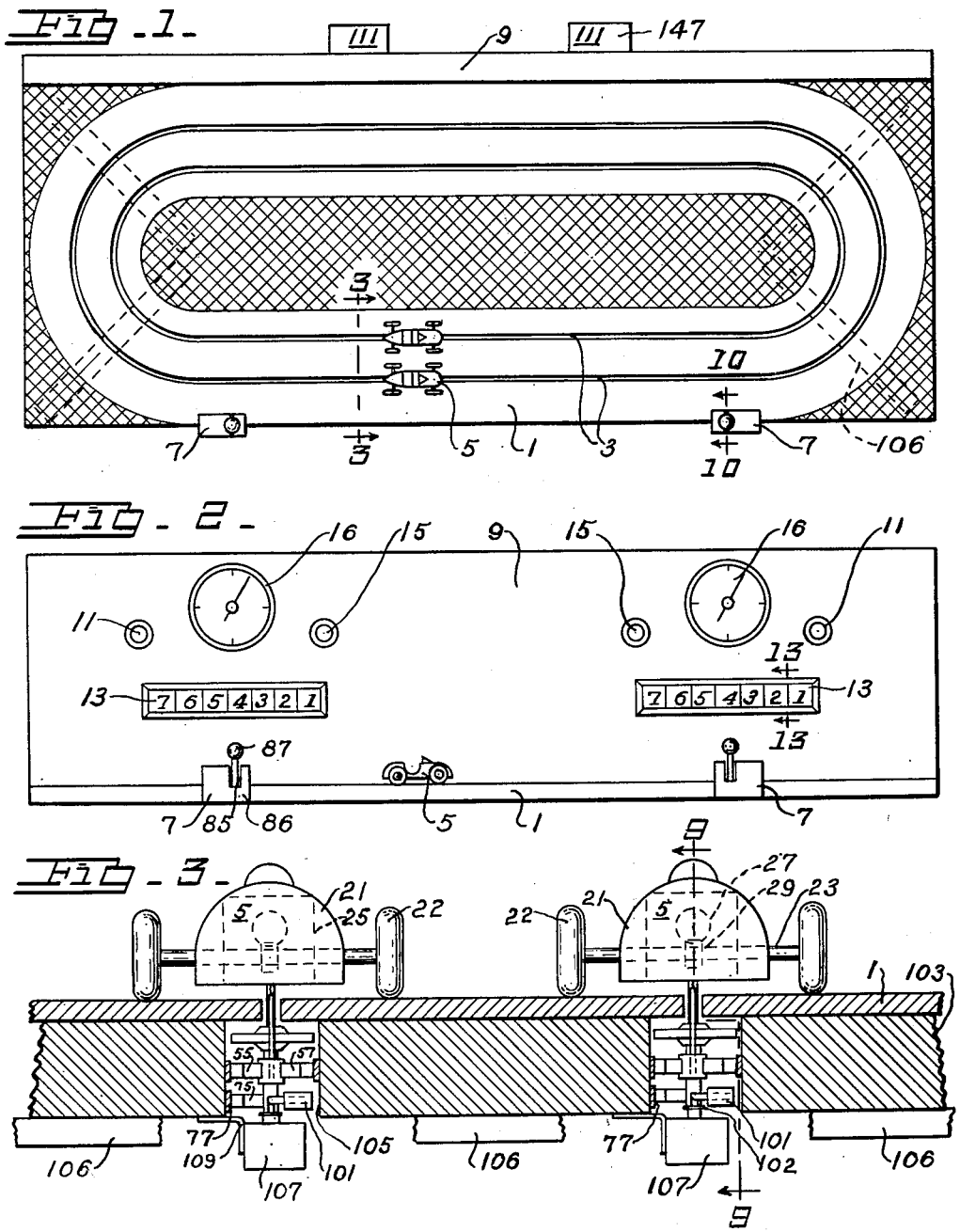

2,631,853

UNITED STATES PATENT OFFICE 2,631,853

RACING GAME APPARATUS

Phillip J. Haynes, Ray Haynes, and John Haynes, Detroit, Mich.

Application June 9, 1950, Serial No. 167,004

5 Claims. (Cl. 273—86)

Our invention pertains to amusement devices which are in the nature of contests of skill and judgment and more particularly to miniature automobile racing apparatus, track and accessories therefor.

It is an object of our invention to provide a miniature automobile race track whereupon miniature automobiles are individually controlled to race competitively similarly to the control of automobiles upon an actual race track.

It is also an object of our invention to provide a miniature automobile race track which can be operated as a competitive contest between a plurality of operators each of whom controls one of the racing automobiles through a system which rewards skill and penalizes lack of skill.

It is a further object of our invention to provide such a miniature automobile race track in which the swerve or skidding of an automobile, as it rounds a curve at excessive speed, is utilized to penalize the driver of that automobile.

Another object of our invention is to provide improved electrical means for energizing, and for controlling and operating electrically driven miniature automobiles on such a miniature race track.

The invention may be more readily understood, along with additional objects and advantages thereof, by reading the following specification in conjunction with the appended drawings, wherein similar reference characters are applied to corresponding elements in the different views, and wherein:

Fig. 1 is a plan view showing the miniature race track adapted for two automobiles, although more than two may be provided for if desired;

Fig. 2 is a front elevational view thereof;

Fig. 3 is an enlarged sectional view on line 3—3 on Fig. 1;

Fig. 4 is a side elevational view, still further enlarged, showing the intermediate insulating brush carrier and brushes removed from the depending pick-up;

Fig. 5 is a plan view thereof;

Fig. 6 is an elevational view showing the depending bushing alone, the other elements being removed;

Fig. 7 is a plan view of the guide wheel removed from the depending bushing;

Fig. 8 is a plan view showing the power pick-up brush and the skid brake which are carried and firmly attached on the lower end of the bushing of the depending control device;

Fig. 9 is a fragmentary enlarged view through the front end of one of the automobiles, indicated approximately by line 9—9 on Fig. 3, for showing the attachment and connection of the depending pick-up and skid control thereon, and the body being omitted;

Fig. 10 is an enlarged sectional view taken on line 10—10 on Fig. 1;

Fig. 11 is an enlarged front elevational view showing the indexing switch;

Fig. 12 is a side elevational view thereof, as fom line 12—12 on Fig. 11;

Fig. 13 is an enlarged sectional view on line 13—13 on Fig. 2; and

Fig. 14 is a diagrammatic view schematically representing the electrical system of connections and apparatus for one automobile.

Referring more specifically to Figs. 1 and 2 of the drawings, it will be seen that we have illustratively disclosed an embodiment of our miniature automobile race track field 1 wherein narrow slots 3 are provided of any suitable form, such as oval shapes, to represent the race tracks to be followed by miniature automobiles 5, and serving other purposes to be subsequently described. The upper surface of the surrounding portions of the field 1 may be ornamented in any desired fashion, as represented by the diagonal checkered shade lines. Adjacent the front edge of the field 1, speed controllers 7 are provided, one for each automobile. One of these speed control throttles 7 is manually adjusted by each individual operator to attain the greatest possible speed from his automobile. Excessive speed will cause a racer to go into a swerve or skid on the curves and the driver is thereby penalized in a manner to be subsequently described in detail.

An instrument panel 9 is provided which rises from the rear edge of the field 1 for supporting some of the control apparatus, and also holding a plurality of timing and indicating devices in a position to be easily viewed by the operators and any spectators, who wish to attend the races. On this panel 9 behind each speed controller 7 are a Start sign 11 which indicates when the race starts, a plurality of serially numbered signs 13 showing Laps Remaining, for each individual automobile, and a Finish sign 15 which indicates when the corresponding car has finished the race. These signs may be controlled in a simple manner by providing a small electric lamp bulb adjacent each sign for illuminating signs individually as the lamps are energized, either by shining upon or through these signs, in a manner well known and common with indicating signs. The manner in which such lamps may be provided and controlled will be explained later.

A timer 16 is provided for indicating the total elapsed time for each automobile, and it is also mounted in a conspicuous position on the panel generally to the rear of the corresponding car controller. This timer 11 may be a well known electric clock device and it is preferably of the kind commonly known as a "reset timer" provided for measuring a few seconds at a time, as in photographic dark rooms and many other places. It is reset by briefly energizing an electromagnet and its connection and control in this system will be described in detail subsequently.

As Fig. 13 shows, the lap indicating signs 13 may be conveniently provided as a sign bearing strip 17 whereupon the lap designating numerals are marked in a side-by-side relation. The strip 17 is of a translucent material, and by merely mounting a small individual incandescent electric lamp bulb 19 behind the strip, enclosed in a suitably partitioned housing 20 these numerals can be effectively displayed by merely energizing the corresponding lamps, in a well known manner. Automatic means is provided whereby these lamps are energized to display the proper numerals in response to the operation of the corresponding automobile, so that the human element is entirely eliminated and there cannot be any controversy or misunderstandings about counting the laps completed and remaining. While such illuminated signs are desirable because of being simple, bright and attractive, it is to be understood that other types of electric or electromagnetic signals or annunciators may be utilized, if desired.

As Figs. 1, 2, 3 and 9 show, the miniature racing automobiles 5 comprise a body 21 conformed to resemble a conventional racer and carried by wheels 22 which are secured on the opposite ends of axle shafts 23 extending from opposite sides of the body wherein these shafts are rotatively disposed, in suitable side frame members 24 seen in Fig. 9. The body 21 may be made of plastic composition, or any other suitable material, and may rest down upon and around the frame pieces 24 and 35, as represented by dotted lines in Fig. 9.

A small electric motor 25 provides the power source in each racer and it drives one axle shaft 23 of the car through any suitable transmission, which may consist of a worm 27 on the motor shaft for driving a worm wheel 29 on an axle shaft, as represented by dotted lines in Fig. 3.

Each miniature racer 5 is provided with a depending guide controller and power pick-up device, shown in greater detail in Figs. 3 through 9, including a guiding pin 31 which extends down from the automobile to pass freely along in the race track guide slot 3. The upper part of this guide pin is bent and has the upper end turned laterally forming a locking pin 33 for convenient releasable attachment to the front end of the car frame, as shown in Fig. 9, where it will be seen that a socket block 35 is secured, as by metal fusion, to the front frame cross bar 37, and it receives locking pin 33 to be clamped into a hole by turning down a screw 39. A vertical recess 41 in the front side receives and holds the guiding pin 31 in a rigid vertical position through the narrow guide slot 3 in the field 1. Below the race track field 1 and its guide slot 3, the guide pin 31 is provided with a tubular bushing 43 having a slot 45 at the lower end for resting upon the lower bent end 47 of the pin, which extends laterally through the slot. The upper end of the bushing 43 is provided with a head flange 49 and a portion 50 of large diameter whereupon a guide wheel 51 is rotatively carried on the upper portion of the bushing adjacent to the head flange. This wheel is also shown in plan view in Fig. 7.

A power pick-up which is disposed intermediately upon the bushing, shown in Figs. 3 through 9, consists of a carrier 53 made of any suitable insulation material and pivotally disposed on the bushing, a spacer 54 holding it up in a proper position. Secured to and projecting from opposite sides of this carrier are two resilient electrical pick-up brushes or contactors 55 and 57. These brushes are made of good conductive resilient metal, such as Phosphor bronze, or any other suitable metal, and the outer ends are curved or curled to provide a smooth sliding shoe for sliding along in good contact with two energizing rails 59 and 61 during the operation of the automobile. In Fig. 5 the arrow designates the direction of forward movement.

Electrical connection is continued from the intermediate brush 55 across the carrier through a suitable conductor 63 soldered to a sleeve 64, and then through the bushing 43, by way of the guide pin 31 through the mounting socket block 35 and by way of frame pieces 37 and 24, into one side of the motor 25, which is grounded to its frame for this purpose. From the other intermediate brush 57, a suitable conductor 65 connects to a pin 67 mounted in upright position on the rear end of the insulating carrier. From the upper end of this pin 67 a flexible wire 69 extends up to a spring clip 71 mounted and insulated on the frame. From this clip a wire 73 extends into the insulated side of the motor. These electrical connections are also diagrammatically represented in Fig. 14. The sleeve 64 also permits relative rotation of the pin 31 so that the brushes 55 and 57 remain on the energizing rails 59 and 61 even when the car skids or swerves.

On the lower end of the bushing 43 a resilient pick-up brush 75 is mounted, in direct conductive relation, as by metal fusion, and it projects laterally for engaging a laterally disposed power rail 77 under normal conditions, and energizing connection to the motor continues up guide pin 31, block 35, and frame pieces 37 and 24, as previously traced from brush 55. But when rounding a curve at excessive speed the centrifugal force causes the rear end of the automobile to swerve or skid outwardly, and then this laterally extended pick-up brush 75 is turned away form its laterally disposed rail 77, as represented by its dotted line position in Fig. 8 and also in the left-hand portion of Fig. 14. This causes tne electric motor to be deenergized and the automobile slows down, or comes to a stop. A difficult operation must then be performed by the driver of this car to resume operation.

Normal running connections are through this lowermost laterally projecting pick-up brush 75 in contact with its laterally disposed rail 77, and the intermediate brush 57 in contact with its rail 61. The electrical motor is energized and its speed is controlled by means of a speed control rheostat or throttle 7, as previously mentioned. As Fig. 10 shows, this electrical rheostat is a rather conventional construction having an electrical resistor 81 curved around in cooperative relation to a centrally pivoted contact arm 83 so that this arm wipes over the resistor and connects more or less of the resistance into the control circuit. The outer end of this arm 83 may project out through a slot 85 in the outer casing 86 and be provided with a knob 87 for convenient manipulation. We also provide this rheostat with an extra resilient contact finger 88 mounted so that it may also be contacted by the swinging part of the contact arm 83 in one particular position. From intermediate rail 59 a wire 89 connects to this contact finger 88, which may be termed a skid pull-out contact. From lower rail 77 a wire 90 connects to the center of the rotary contact arm 83 of the rheostat, as by way of its central pivot or shaft 91. From one end of the rheostat resistor 81 a wire 93 connects to one terminal of the low voltage secondary 95 of a step-down transformer T, and from the other terminal of this winding a wire 97 connects to the other power rail 61. The casing 86 of this rheostat may be attached to the front edge of the race track field in any suitable manner, as by bolts 98.

In this arrangement, it will be apparent that the slowest speed of the controlled automobile will be obtained by turning the rheostat arm 83 toward the position which cuts in the resistance of the resistor. As shown in Fig. 14, in full lines, this is toward the left. Turning the contact arm 83 up and toward the right, as represented at dotted line position A cuts out resistance and provides high speed. If the racer goes into a skid and swings around this interrupts the connection between lowermost pick-up brush 75 and its rail 77, because of the laterally disposed positions of these members, and this slows or stops the racer.

Now to start up his car the operator must turn this contact arm 83 to the left-hand side to the dotted line position B so it touches the resilient contact finger 88. This now energizes the motor through wire 89, rail 59 and brush 55 and up to the grounded side of the motor as previously traced.

But this is a slow speed position as a considerable amount of the resistance of the resistor 81 is cut into the circuit in this position. It is then to the advantage of the operator to get his automobile out of its skidded position so that its normal running connections will be restored. This requires particular skill according to the position of the car. As the automobile straightens out contact is resumed between brush 75 and rail 77 and then the speed throttle 7 can be turned to a higher speed position and the operator can try to make up for lost time. Very much in the manner of a real automobile race, the results are determined by the good judgment and skill of the operators. When released, the arm 83 is moved to the low speed position by a spring 92.

To make the operation still more realistic, the lower bent end 47 of the follower pin 31, which supports the lower end of the bushing 43, is also provided with a skid brake shoe 101 which may be a bent piece of sheet metal secured, as by soldering it directly thereto. This brake shoe 101 projects to a rearward position and is free during normal operation. But when the racer goes into a skid and its rear end swerves around, this turns the brake shoe 101 to engage against a stationary braking surface, which may be the side of the tunnel under the field. This also limits the degree of skid of the automobile.

A curved actuator shoe 102 is secured rigidly upon the bottom of the guide pin 31 and bushing 43 for actuating lap counting apparatus, in a manner to be described.

The race track field 1 may be made of plywood, plastic sheet, or other material, and supported upon a base 103 which may be made of wood, plastic or other material. This base is provided as shown in Fig. 3, with recesses or tunnels 105 which extend around accurately centered under the race track slots 3 provided in the field 1, and which are substantially wider. These tunnels are made of suitable accurate widths and the side walls serve for mounting the power rails and as braking surfaces to be engaged by the brake shoe 101 when the automobile goes into a skid. To secure all parts of the racing field 1 in an accurately spaced rigid relation any desired number of cross-braces 106 are secured thereunder, as shown by dotted lines in Fig. 1.

For automatically counting the laps as each car passes its finish line, each race track is provided with a sensitive switch or push button device 107, supported by a bracket 109 in a suitable position at the bottom of the tunnel to be depressed by the actuator 102, as shown in Figs. 3 and 9. In combination therewith an indexing switch 111 is utilized for controlling the lap indicating signs or signals 13 mounted on the panel 9 of the race track field, as shown in Fig. 2, and as previously described.

The indexing switch, as shown in Figs. 11 and 12, comprises an electrical contact arm 113 having one end secured upon a shaft 115, as by a key 117, so that it rotates with the shaft to swing its free end around a circular orbit. This end of the shaft is threaded to receive a nut 116 for holding the contact arm thereon. The shaft passes rotatively through a bushing 118 in the center of a panel 119 of insulation material and it preferably is of substantially a disc shape having a diameter about equal to the diameter of the circle described by the outer swinging end of the contact arm. The outer end of this contact arm 113 is shaped to form a smoothly curved cam 121 and it extends to a length suitable for engaging a series of resilient outer contacts 123 which are mounted at spaced positions around the periphery of the panel disc. Each such outer contact is made of a thin strip of suitably resilient metal and mounting is easily accomplished by providing a laterally bent mounting tab 125 on one end of each such contact for snug attachment, as by screws 127 shown dotted in Fig. 11, on the side of the panel remote from the arm and so that each such contact extends across the periphery of the panel disc projecting its free end into the path of the swinging end of the contact arm 113. As the rotating contact arm comes to the position of each such outer contact 123, it completes a circuit by establishing electrical contact therewith. At the same time, the rotating arm, by reason of its shape, smoothly presses the adjacent outer contact outwardly, and this also moves the outer contact away from an inner contact 129, for breaking a circuit established between these two contacts at all other times. These inner contacts 129 are mounted in the periphery of the disc shaped panel, one under each outer contact to be engaged thereby as it springs inwardly.

For actuating the contact arm 113 step-by-step into engagement with each of the outer contacts 123 successively, a suitable ratchet wheel 131 is secured, as by a key 132, on the end of the shaft 115 remote from the arm. Freely rotatable on the shaft 115 is one end of a ratchet arm 133 having a pawl 135 loosely pivoting on a pin 137 on the arm so that the other end of the pawl falls back of the next tooth on the ratchet wheel as the free end of the ratchet arm moves down. For lifting the swinging end of the ratchet arm 133 to turn the contact arm 113, a solenoid 139 is provided having an armature plunger 141 loosely connected by a pivot pin 142 to a loop 143 extending around the extended end of the ratchet arm. By making the stroke of this plunger of suitable length, and by mounting the solenoid 139 a proper distance from the shaft, the ratchet arm is lifted a proper distance to move the contact arm 113 to occupy the position in contact with the next successive outer contact 123 each time it is operated. A shield 145 is provided for protecting the electrical connections which are soldered to and extend from the contact tabs 125 on the adjacent side of the panel 119. This shield may be a simple disc of insulation material centrally apertured to fit loosely upon the bushing 118 and held by a central projection in spaced relation to these electrical connections.

The indexing switch may be enclosed in a suitable protective casing 147 which also serves for mounting the solenoid and the panel of this switch in suitable cooperative relation, and which also serves for mounting the entire device on the back of the instrument panel 9. A mounting bracket 148 extends through the space between the ratchet wheel 131 and the shield 145 and it is apertured for snugly receiving the adjacent end of the bushing 118 wherein the switch shaft 115 rotates. The ends of this bracket may be turned to form mounting lugs secured to the walls of the outer casing 147, as by screws 150, for mounting the indexing switch therein. From this mounting bracket a contact bracket 152 extends around adjacent the center of the opposite side of the switch, where it supports an insulated contact brush 154 continuously engaging the rotating contact arm 113, on its inner end 156 which is curled back across the end of its shaft 115 providing a resilient contact in alignment with the axis of rotation, for this purpose. The solenoid 139 is supported at a proper position on the back wall of the casing by a clamp band 158 secured thereto by screws 160.

As Fig. 14 shows, the lap counting solenoid 139 of the indexing switch is energized in series with the sensitive switch 107 which is actuated each time the automobile completes a circuit around its track. This is accomplished by an energizing circuit which may be traced through a wire 149 extending from one side L1 of the usual service line to one terminal of the solenoid 139, a wire 151 extending from the other terminal of the solenoid to one terminal of the sensitive switch 107 and another conductor 153 extending to the other service line conductor L2.

Also, as shown in Fig. 14, the full service line voltage is also utilized for energizing all the lap counting sign lighting lamps 19, the start light 11, the finish light 15 and the timer 16. Signs 11 and 15 may be distinctive colored lamps. This is accomplished by extending a conductor 159 from service line L2 to one side of each of these lights, and to the timer. From the other line conductor L1 a conductor 161 is connected to the rotating contact arm 113 of the indexing circuit maker and breaker. From the other side of the highest lap number lamp 19 a wire 163 is connected to one of the outer contacts 123, and from this outer contact an inner connection 165 extends to the inner contact 129 of the next pair of contacts in the direction of rotation. As may be seen, a similar inner connection is provided from every outer contact to the inner contact of the next pair of contacts which controls a lap indicating lamp. The lap number "6" lamp 19 is connected by a conductor 169 to the next successive outer contact 123 on the indexing switch, and conductors 171, 173, 175, 177 and 179 establish similar connections from the lap indicating lamps 19 to the outer contacts 123 of the indexing switch in the successive order in which these are engaged by the rotating contact arm 113 of the indexing switch, which rotates counterclockwise, as viewed in Fig. 14. The start light 11 is connected in parallel with the lap number "1" lamp 19 by means of a conductor 181 extending from its other terminal, so that it shows at the same time. Also the timer 16 is connected in parallel by a conductor 183.

As shown in full lines, the contact arm 113 is in position A, the starting position, where it engaged the outer contact 123 which directly energizes the conductor 163 to the lap indicating lamp 19 which is at the right in Fig. 14. This displays the largest lap number, i. e., "7" in this example, as shown, at the same time, this outer contact is pressed outwardly, as represented in full lines, but this does not open any circuit as the adjacent inner contact 129 is not connected into the system.

At the same time all the other lap number indicating lamps 19 are energized. This is accomplished through the inner connections 165 of the switch, as all the other outer contacts are resting in contact with the adjacent inner contacts.

From one side of the "Finish" lamp 15 a conductor 185 connects to the live conductor 159, and from the other side of this lamp 15, a conductor 187 connects to the lowermost outer contact 123 on the indexing switch, so that when the rotating contact arm 113 reaches this last position, shown dotted and designated H, the "Finish" lamp will flash.

It is to be understood that although seven lap number indicating lamps have been shown for counting and indicating seven laps around the race track, any number may easily be provided for, by merely adding sufficient contacts for the indexing switch and connections as required.

Operation begins when the rotary contact arm of the indexing switch moves to the full line position A in Fig. 14, and through the corresponding outer contact 123 all the lap indicating lamps 19 were energized. These circuits are readily traced by way of the contacts and connections as previously described, since all the succeeding pairs of outer and inner contacts are closed and the energizing connections are complete. Also the "Start" lamp 11 and the timer 16 being connected in parallel with the last or number "1" lap indicating lamp 19, are energized at the same instant and remain energized therewith. As the corresponding miniature automobile completes its first lap, the sensitive switch 107 is actuated to provide an energizing impulse for the solenoid 139. This actuates the step-by-step mechanism of the indexing switch and moves the contact arm 113 of the switch to the next position counter-clockwise, designated B and shown dotted, in Fig. 14. This presses the adjacent outer contact 123 away from its inner contact to deenergize the lap indicating lamp 19 which displays the number "7" on the lap indicating panel, as there are no longer seven laps remaining.

Upon completing each successive lap the racing automobile similarly causes the contact arm 113 of the indexing switch to move to another step in a counter-clockwise direction, as indicated by the arrow, as viewed in Fig. 14, thus turning off the lap indicating numbers "6," "5" on the Laps Remaining sign, until the last lap indicating number "1" is turned off when the Start lamp is turned off and the timer 16 is stopped. The contact arm 113 is then in the lowermost position represented in dotted lines at H, and the "Finish" lamp is flashed. The timer reset electromagnet is energized by merely operating a switch 191, which may be a convenient push button, for completing a circuit through conductors 193 to the timer 16, thence by conductor 195 to switch 191 and through conductor 197, from the low voltage winding of transformer T.

The total time which elapsed from the instant the automobile started the race on this track until it flashed across the finish line of the last lap is thus accurately measured and positively displayed, so that the human factor is eliminated. It will be seen that the race is conducted in a very realistic manner and that the final result is determined by the skill and good judgment of the drivers in operating their respective racing automobiles.

The racing automobiles and the depending pick-up assemblies are readily removed, replaced or repaired, because of the convenient manner in which these pick-ups are removed from each automobile by merely releasing the locking screw in the front end socket block, as previously described.

Although the race track field is shown as adapted to accommodate only two racing automobiles, it can readily be provided with a greater number of race track grooves, controls and indicating apparatus, as will be readily understood.

It is apparent that within the scope of the invention modifications and different arrangements may be made other than herein disclosed, and the present disclosure is illustrative merely, the invention comprehending variations thereof.

What is claimed as the invention is:

1. In miniature automobile racing apparatus the combination of, a miniature automobile race track field having open guide grooves defining a plurality of curved racing tracks in a side-by-side relation for competitively racing a corresponding plurality of miniature automobiles, two electrical automobile energizing power rails disposed laterally in each of said grooves for normally energizing a corresponding electric automobile to run around the groove by engagement with laterally projecting pick-up brushes for the automobile, individual speed control rheostats mounted in convenient spaced positions one for each race track, an electrical power source, electrical conductors connecting said rheostats to energize said power rails from said source to impart speeds to each individual automobile as desired by the respective operators thereof, a skid power rail in each groove for energizing the corresponding automobile when it goes into a skid and moves a normal pick-up brush away from one of the normal power rails, a skid pull-out contact disposed at a slow speed position on each rheostat for engagement at a slow speed operating position, and electrical conductors connecting from each skid power rail to the skid pull-out contact on each rheostat so that the operator of a skidded automobile will have to carefully return his speed control rheostat to a certain slow speed position to engage said skid pull-out contact and hold such a slow speed control position until the car resumes proper position and operation.

2. In miniature automobile racing apparatus the combination of, a miniature automobile race track field having open guide grooves defining a plurality of curved racing tracks in a side-by-side relation for competitively racing a corresponding number of miniature automobiles, two electrical automobile energizing power rails substantially parallel to each of said grooves for normally energizing a corresponding electric automobile to run around the groove, an individual speed control rheostat for each track, an electrical power source, electrical conductors connecting the individual rheostats to energize said power rails from said source to impart speeds to each individual automobile as desired by the operator of each such automobile, a skid pick-up rail substantially parallel to each groove for energizing the corresponding automobile when it goes into a skid and moves away from one of the power rails, a skid pull-out contact on each rheostat for engagement at a slow speed operating position, electrical conductors connecting from each skid pick-up rail to a point on each rheostat so that the operator of a skidded automobile will have to carefully return his speed control rheostat to a slow speed position to engage said skid pull-out contact before he can resume the race, an electrical power driven miniature automobile disposed in cooperative combination adjacent each track guide groove, a depending pick-up projecting down from each automobile into its guide groove and having three brushes in normal running engagement with all three corresponding power rails but one of said brushes being movable away from its power rail when excessive speed of the corresponding automobile causes it to go into a skid and the operator must perform the difficult aforesaid manipulation of the corresponding rheostat to resume operation.

3. Miniature automobile racing apparatus in accordance with claim 2 and the depending pick-up of each automobile having a skid brake which tends to engage adjacent stationary structure in the groove to limit the skidded position of a skidding automobile, and to retard the speed thereof.

4. In miniature automobile racing apparatus the combination of, a miniature automobile race track field having open guide grooves defining a plurality of curved racing tracks in a side-by-side relation for competitively racing a corresponding number of miniature automobiles, two electrical automobile energizing power rails disposed laterally in each of said grooves for normally energizing a corresponding electric automobile to run around the groove, an individual speed control rheostat for each track, an electrical power source, electrical conductors connecting the individual rheostats to energize said two laterally disposed power rails from said source to normally impart speeds to each individual automobile as desired by the operator of each such automobile, a skid pick-up power rail substantially parallel to each groove for supplying energizing current to the corresponding automobile when it goes into a skid and moves a laterally disposed pick-up brush away from one of said laterally disposed power rails, a skid pull-out contact on each rheostat for engagement at a slow speed operating position, electrical conductors connecting each skid pick-up rail to the skid pull-out contact on the corresponding rheostat so that the operator of a skidded automobile will have to carefully return his speed control rheostat to a slow speed position to engage said contact in order to pull out of a skid and resume the race, an electrical power driven miniature automobile disposed in cooperative combination adjacent each track guide groove, each automobile comprising an automobile frame structure, four wheels projecting rotatively from said frame structure for carrying it about a race track, a guide and pick-up device secured to said frame and projecting down for cooperative disposal in a respective one of the guide grooves in the racing field for guiding the miniature automobile about the corresponding race track thereon, said guide and pick-up being secured adjacent the front end of said frame so that centrifugal force will cause the rear end of the miniature automobile to skid or swerve outwardly when driving at an excessive speed around a curve, and said guide and pick-up having three brushes disposed for normal running engagement with the three corresponding power rails respectively but one of the normal running brushes extending in a fixed lateral relation from the automobile to be movable away from its laterally disposed power rail when excessive speed of the corresponding automobile causes it to go into a skid or swerve so that the operator must perform the difficult aforesaid manipulation of moving the corresponding rheostat to engage said skid pull-out contact at a slow speed position to resume operation.

5. Miniature automobile racing apparatus in accordance with claim 4 and further characterized by the depending pick-up of each automobile having a skid brake which tends to engage adjacent stationary structure in the groove to limit the skidded position of a skidding automobile, and retard the speed thereof.

PHILLIP J. HAYNES.
RAY HAYNES.
JOHN HAYNES.

REFERENCES CITED

The following references are of record in the file of this patent:

UNITED STATES PATENTS

| Number | Name | Date |
|---|---|---|
| 1,657,511 | Lorenz et al. | Jan. 31, 1928 |
| 1,668,249 | Rich | May 1, 1928 |
| 1,844,169 | Livingston | Feb. 9, 1932 |
| 1,999,052 | Kennedy | Apr. 23, 1935 |
| 2,026,181 | Kennedy | Dec. 31, 1935 |
| 2,036,603 | Pallada | Apr. 7, 1936 |
| 2,068,403 | Ekstrom | Jan. 19, 1937 |
| 2,115,108 | Horn | Apr. 26, 1938 |
| 2,188,619 | Bernhardt | Jan. 30, 1940 |
| 2,199,329 | Beyer et al. | Apr. 30, 1940 |
| 2,230,563 | Garms et al. | Feb. 4, 1941 |
| 2,368,874 | Poole | Feb. 6, 1945 |
| 2,417,788 | Soffel | Mar. 18, 1947 |
| 2,510,241 | Miller | June 6, 1950 |
| 2,540,808 | Bliss | Feb. 6, 1951 |

FOREIGN PATENTS

| Number | Country | Date |
|---|---|---|
| 919 | Great Britain | 1905 |
| 789,170 | France | Aug. 12, 1935 |